US008935394B2

(12) United States Patent
Ristock et al.

(10) Patent No.: US 8,935,394 B2
(45) Date of Patent: *Jan. 13, 2015

(54) METHOD AND SYSTEM FOR PROPAGATING STATISTICS BETWEEN FEDERATED CONTACT CENTER SITES FOR USE IN EVENT DISTRIBUTION

(71) Applicant: Genesys Telecommunications Laboratories, Inc., Daly City, CA (US)

(72) Inventors: Herbert Willi Artur Ristock, Walnut Creek, CA (US); Sergey I. Federov, Daly City, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,870

(22) Filed: Jan. 4, 2013

(65) Prior Publication Data

US 2013/0191551 A1 Jul. 25, 2013

Related U.S. Application Data

(63) Continuation of application No. 11/965,622, filed on Dec. 27, 2007, now Pat. No. 8,370,480.

(51) Int. Cl.
*G06F 15/173* (2006.01)
*H04L 12/751* (2013.01)
(Continued)

(52) U.S. Cl.
CPC ............ *H04L 45/08* (2013.01); *H04L 41/5064* (2013.01); *H04M 3/5237* (2013.01); *H04M 2201/10* (2013.01); *H04M 2201/36* (2013.01)

USPC .................. 709/224; 379/265.1; 379/266.09; 709/225

(58) Field of Classification Search
USPC .................. 709/224–225; 379/265.1, 266.09
See application file for complete search history.

(56) References Cited

U.S. PATENT DOCUMENTS 5,450,482 A 9/1995 Chen et al.
5,590,188 A 12/1996 Crockett
(Continued)

FOREIGN PATENT DOCUMENTS

EP 1 432 189 A 6/2004

OTHER PUBLICATIONS

International Search Report and Written Opinion dated May 8, 2009, for International Application No. PCT/US2008/087955, 16 pgs.
(Continued)

*Primary Examiner* — Duyen Doan
(74) *Attorney, Agent, or Firm* — Christie, Parker & Hale, LLP

(57) ABSTRACT

A routing system includes a router, a statistics server (Stat Server) coupled to the router, receiving, processing and storing statistics related to event handling, and providing information regarding the statistics for use by routing intelligence in the router, and a first proxy data server coupled to the Stat Server and to a second proxy data server at a remote contact center over a network. The system is characterized in that the Stat Server receives event statistics regarding the local queue, and through the coupled first and second proxy data servers, event statistics regarding the remote queue, provides information related to the statistics to the router, and the router determines to route incoming events to local queue or to the remote queue based on the information provided.

14 Claims, 6 Drawing Sheets

(51) Int. Cl.
*H04L 12/24* (2006.01)
*H04M 3/523* (2006.01)

(56) References Cited

U.S. PATENT DOCUMENTS

| | | | |
|---|---|---|---|
| 6,229,888 B1* | 5/2001 | Miloslavsky | 379/265.01 |
| 6,522,743 B1* | 2/2003 | Hurd | 379/266.04 |
| 6,714,642 B2* | 3/2004 | Dhir et al. | 379/265.02 |
| 6,744,878 B1 | 6/2004 | Komissarchik et al. | |
| 6,868,152 B2* | 3/2005 | Statham et al. | 379/265.02 |
| 7,146,002 B1* | 12/2006 | Smith et al. | 379/265.13 |
| 7,197,130 B2* | 3/2007 | Paden et al. | 379/265.02 |
| 7,263,717 B1 | 8/2007 | Boydstun et al. | |
| 7,266,192 B2* | 9/2007 | Statham et al. | 379/265.02 |
| 7,366,293 B2* | 4/2008 | Ezerzer et al. | 379/265.1 |
| 8,254,556 B2* | 8/2012 | Baumeister et al. | 379/265.02 |
| 8,370,480 B2* | 2/2013 | Ristock et al. | 709/224 |
| 2004/0028213 A1 | 2/2004 | Goss | |
| 2004/0213209 A1 | 10/2004 | O'Connor et al. | |
| 2005/0148338 A1* | 7/2005 | Baumeister et al. | 455/455 |
| 2006/0067506 A1 | 3/2006 | Flockhart et al. | |
| 2006/0072737 A1* | 4/2006 | Paden et al. | 379/221.01 |
| 2006/0098583 A1* | 5/2006 | Baker et al. | 370/252 |
| 2007/0165830 A1 | 7/2007 | Paden et al. | |
| 2007/0206769 A1 | 9/2007 | O'Dell, III | |
| 2007/0230682 A1 | 10/2007 | Meghan et al. | |
| 2008/0219429 A1 | 9/2008 | Mandalia et al. | |
| 2010/0077082 A1 | 3/2010 | Hession et al. | |

OTHER PUBLICATIONS

Chinese Office Action dated Oct. 9, 2012, for Application No. 200880122955.7 and corresponding English Translation 18 pgs.
Chinese Office Action dated Sep. 5, 2013, for Application No. 200880122955.7 and corresponding English Translation 10 pgs.
Chinese Office action along with English Translation for Application No. 200880122955.7, dated May 19, 2014, 6 pages.
European Office action for Application No. 08867567.3, dated Jul. 24, 2014, 6 pages.

* cited by examiner

METHOD AND SYSTEM FOR PROPAGATING STATISTICS BETWEEN FEDERATED CONTACT CENTER SITES FOR USE IN EVENT DISTRIBUTION

CROSS-REFERENCE TO RELATED APPLICATIONS

This application is a continuation of U.S application Ser. No. 11/965,622, filed Dec. 27, 2007, the content of which is incorporated herein by reference.

BACKGROUND OF THE INVENTION

1. Field of the Invention

The present invention is in the field of telecommunications, and pertains particularly to acquiring contact center statistics of a service provider site from the point of a consumer site for the purpose of determining best routing strategy for event routing.

2. Discussion of the State of the Art

In the field of contact center operations there are companies that use contact center services provided by a service provider according to contract to help them with sales, service, and customer relations management (CRM). Many of these companies have their own contact center service capabilities, but contract out for additional support such as a peak periods or times of high call volume. Such arrangements between contact center sites are known in the art as federated service arrangements, and a group of two or more contact centers in this case share duties. The arrangement of two or more contact centers, typically but not necessarily owned by different enterprises, sharing duties and tasks is termed a federated contact center (FCC).

In a federated contact center federated entities or contact center sites assume two roles, that of a service consumer and/or a service provider. As a service provider, a federated entity may determine to expose to a consumer only queue type objects such as routing points (RPs) and automated call distributor (ACD) queues. Further event processing may be performed on the provider site transparently to the consumer.

In many federated service arrangements, it may be desired by the service consumer that it be enabled to observe service provider queues in order to be able to make decisions on an ongoing basis about the volume of events that will be routed to the provider for servicing. To make such decisions, the service consumer needs to monitor vital contact center statistics such as average speed of answer (ASA), expected or estimated wait time (EWT) and so on.

In order to calculate statistics for provider queues, a monitoring application is required to receive all events related to the provider queues. This means that provider agent events have to be accessible to the service consumer. In many cases, such access violates provider intent to expose only a small part of its infrastructure to the consumer.

Therefore, what is clearly needed is a system and methods enabling a consumer in a federated contact center arrangement to monitor provider queues for statistics without having full visibility of the provider's infrastructure.

SUMMARY OF THE INVENTION

In an embodiment of the invention a routing system is provided, comprising a router, a statistics server (Stat Server) coupled to the router, receiving, processing and storing statistics related to event handling, and providing information regarding the statistics for use by routing intelligence in the router, and a first proxy data server coupled to the Stat Server and to a second proxy data server at a remote contact center over a network. The system is characterized in that the Stat Server receives event statistics regarding the local queue, and through the coupled first and second proxy data servers, event statistics regarding the remote queue, provides information related to the statistics to the router, and the router determines to route incoming events to local queue or to the remote queue based on the information provided.

Also in an embodiment a federated contact center is provided, comprising a consumer contact center having a first router coupled to a first Stat Server and a first proxy data server coupled to both the first router and the first Stat Server, and a provider contact center having a second router coupled to a second Stat Server and a second proxy data server coupled to both the first router and the first Stat Server, and further connected through a network with the first proxy data server. The federated center is characterized in that the second Stat Server compiles routing statistics regarding the provider center, and provides the compiled routing statistics to the first Stat Server over the network via the connected proxy data servers, and in that the first Stat Server provides information regarding the provided statistics to the first router to make routing decisions.

In another embodiment a provider contact center in a federated contact center is provided, comprising a router, a statistics server (Stat Server) coupled to the router, receiving, processing and storing statistics related to event handling, and providing information regarding the statistics for use by routing intelligence in the router, and a first proxy data server coupled to the Stat Server and to a second proxy data server at a remote consumer contact center over a network. The provider center is characterized in that the Stat Server calculates statistics regarding one or more queues local to the provider contact center, and through the coupled first and second proxy data servers, propagates event statistics regarding the one or more local queues to the second proxy data server for use by a consumer contact center in making routing decisions.

In another aspect of the invention, in a federated contact center, a method for determining if an event should be routed to a consumer queue or to a provider queue is provided, comprising the steps of (a) receiving a event for routing; (b) receiving statistics regarding the provider queue; (c) receiving statistics regarding the consumer queue; and (d) selecting, based on the statistics, either the provider queue or the consumer queue as a destination for the event.

In another embodiment a routing method is provided, comprising (a) receiving event statistics at a first Stat Server regarding a first local queue, and, via a first proxy data server connected through a network to a second proxy data server in a remote contact center, receiving statistics from a second Stat Server in the remote contact center regarding a second queue also in the remote contact center; (b) providing information calculated from the statistics received to a router; and (c) selecting to route a received event to either the first local queue or to the second queue in the remote data center based on the information provided to the router.

In yet another embodiment, in a federated contact center, a method is provided for facilitating routing decisions, comprising the steps of (a) compiling first event-handling statistics by a first Stat Server in a provider contact center; (b) compiling second event-handling statistics by a second Stat Server in a consumer contact center; (c) sharing the first statistics with the second Stat Server in a consumer center via proxy data servers in each center, the proxy data servers connected over a network; (d) providing information based on the first and second statistics to a router in the consumer contact center; and (e) determining to route a received event to a second queue in the second contact center or to a first queue in the first contact center based on the information provided to the router.

In still another embodiment a method for facilitating routing in a first contact center is provided, comprising the steps of (a) collecting statistics regarding event-handling in the first contact center by a first Stat Server; (b) providing the statistics to a remote contact center through a first proxy data server in the first contact center connected over a network to a second proxy data server in the remote contact center; and (c) receiving at a queue in the first contact center events routed from the remote contact center based at least in part on the statistics sent to the remote contact center.

BRIEF DESCRIPTION OF THE DRAWING FIGURES

DETAILED DESCRIPTION

Figure 1:
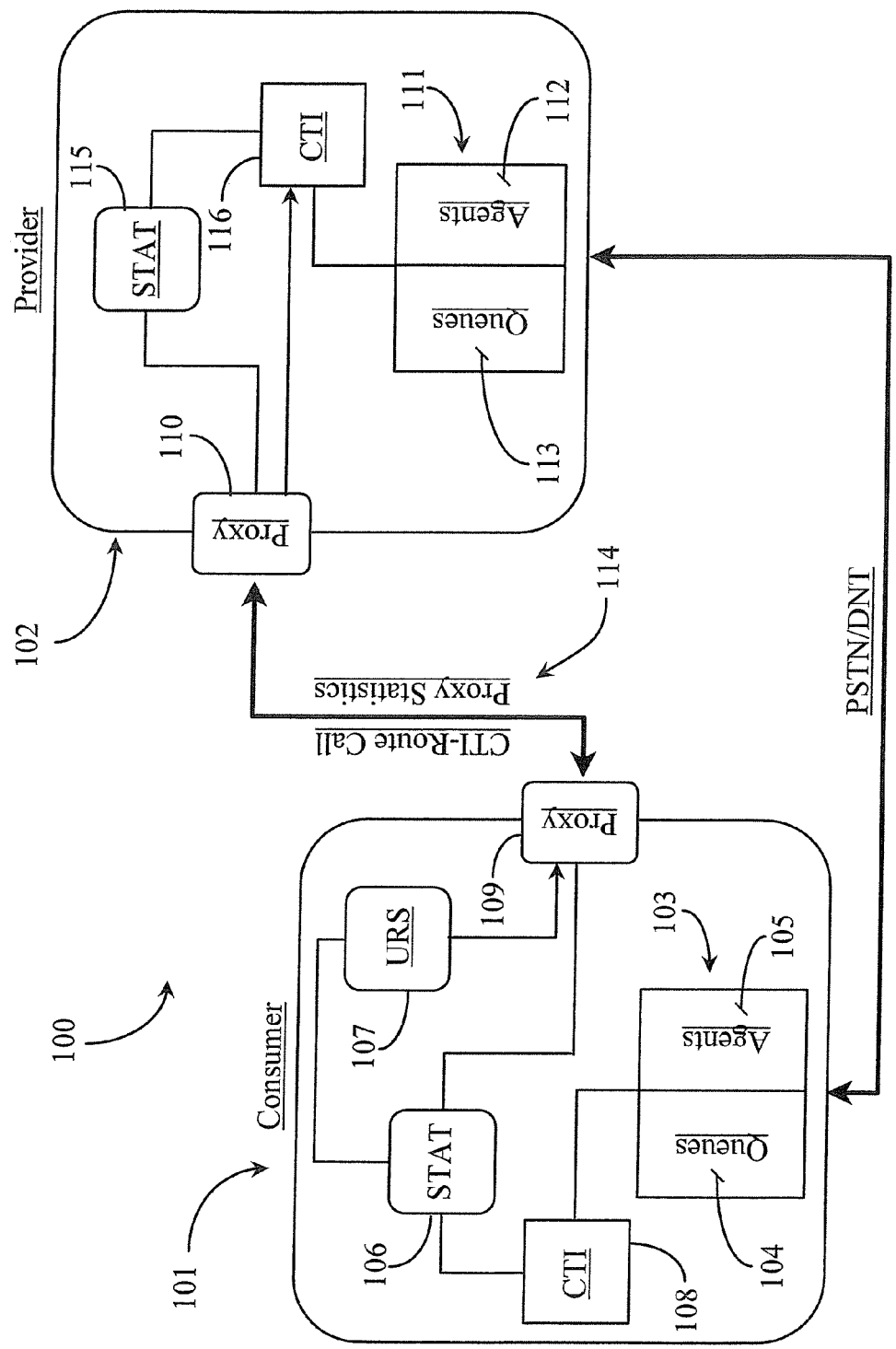
FIG. 1 is a block diagram illustrating a federated contact center environment adapted for remote statistics propagation for use in routing according to an embodiment of the invention.

FIG. 1 is a block diagram illustrating a federated contact center environment 100 adapted for remote statistics propagation for use in routing intelligence according to an embodiment of the present invention. Federated contact center 100 is a network of connected contact center sites including at least one consumer site 101 and at least one provider site 102. Within federated environment 100, a consumer site such as site 101 is a contact center site that contracts with a provider site such as provider site 102 for event handling services including but not limited to telephony call event processing. The invention is applicable as well to routing and processing of communication events of all sorts.

In this example, consumer site 101 contracts with provider site 102 for help in processing incoming events to the consumer site. As was described with respect to the discussion of the state of the art section above, consumer site 101 needs to be able to monitor certain contact center statistics in provider site 102 in order to determine at least acceptable flow ratios of incoming events that will be handled locally, that is, by the consumer site, and those that will be handled by the provider site. Provider site 102 may not wish to expose its entire infrastructure to the client site, therefore the invention is accomplished in a way that enables the consumer to obtain useable statistics without having direct access to the databases and entire infrastructure of the provider.

Consumer site 101 includes a switch 103, which may be a private branch exchange (PBX), or an automated call distributor (ACD), or some other type of switch capable of distributing events. Switch 103 is not required to reside within the physical domain of site 101 or to be owned by site 101. Switch 103 may be an off-site or on-site piece of equipment that is leased. Switch 103 may also be a soft switch residing as a software application running no a general purpose computer.

In this example, switch 103 serves as a central switch for distributing events both internally and externally to a provider site. Incoming events to site 101 are staged in queues 104 logically illustrated within switch 103 in this example. Agents 105 are logically illustrated also within switch 103 and are enabled to process incoming events routed to group or agent queues or directly to agents.

Provider site 102 includes a distribution switch 111, which may be a PBX or an ACD, or some other type of switch capable of processing incoming events, or a soft switch. Like switch 103 described above, switch 111 may be on-site or off-site and leased or owned by the provider site. Switch 103 has a public-switched-telephone-network (PSTN) connection to switch 111 in one embodiment. In another embodiment, the network connection may be a data network telephony connection, and in another both networks may be connected, so all types of network events may be supported. Under certain pre-arranged conditions, a portion of events incoming to switch 103 is routed to switch 111 for event handling based on need at the time of routing. A typical situation is that center 101 may manage flow between itself and the provider site 102 by queue management statistics such as comparing ASA or EWT between local and remote queues. Other specific situations will also be evident from the embodiments described herein.

Switch 111 within site 102 in this example includes event queues 113 and agents 112 illustrated logically therein. Queues 113 are adapted to stage incoming events that were routed to switch 111 from switch 103 according to some routing intelligence. Agents 112 are adapted to work queues 113 to process events. In typical implementation, agents are stationed on a local area network (LAN) at individual computerized agent stations outfitted with LAN-connected computers, telephones, and other communications equipment. Switch 111 is CTI-enabled in this example by a CTI processor/server 116, which is connected to a statistics (STAT) server 115. Stat server 115 is adapted similarly as is stat server 106 and compiles statistics about agents, queues and routing points. In this example, statistics are typically calculated from CTI monitored data.

Switch 103 is CTI-enabled by a CTI-processor/server 108, which may be a T-server as known to the inventor for providing distribution control. Switch 111 in site 102 is CTI enhanced by a CTI-processor/server 116, which may also be a T-server. CTI processor/server 108 has a CTI link connection to switch 103 and a data connection to a statistics (Stat) server 106. Stat server 106 is adapted for monitoring event queues, routing points, and agents via CTI event reporting for the purpose of calculating useable statistics from the events for use in routing intelligence. Such statistics may include ASA or EWT statistics for queues, total number of events answered, total number of events abandoned, and other like queue-based statistics. Monitored statistics may also include key performance indicators (KPIs) related to contact center performance according to a service level objective (SLO) maintained by the center.

Consumer site 101 includes a universal routing server (URS) 107 connected to Stat server 106 and to CTI server 108. URS 107 is adapted to execute routing strategies based on statistics from stat server 106. URS 107 is enabled by routing software and is capable of processing statistics to obtain route determinations on an event-by-event basis. In some embodiments, the functions and capabilities of URS 107 and CTI 108 may be combined to run on one processing/server node.

In this example, provider site 102 does not include a routing server such as URS 107 illustrated within contact center 101. For the purposes of discussion only, intelligence in routing is limited in this example to the consumer site as it is the consumer in this case that must decide what percentage of incoming events will be handled by the provider. In some cases, depending on routing strategies used, provider site 102 might also include an intelligent routing server capability for specific internal intelligent routing purposes for internal routing of incoming events from the consumer site. One such embodiment is described below in this specification.

A proxy server-based data propagation network 114 is illustrated in this example and is adapted to provide special communications and data propagation capabilities between the federated contact center sites 101 and 102. Consumer site 101 includes a proxy server node 109 that is adapted to serve data both internally to consumer-site proxy clients and externally to a like proxy server node 110 provided within provider site 102. In site 101, proxy node 109 is coupled to URS 107 and to stat server 106. Proxy server 109 communicates with proxy server 110 in this example via a proxy server protocol termed federated proxy or F-Proxy protocol by the inventors. The network connection between proxy servers 109 and 110 may be a dedicated network or a shared bandwidth network reserving bandwidth or at least a high level of quality of service (QoS) for communication between the federated contact centers. F-proxy protocol may be an eXtensible markup language (XML) based protocol that includes support for propagation of contact center statistics, CTI-routing notifications, event data, and CTI-based user events.

It is noted herein that configuration servers (not illustrated) are assumed present in both contact center sites 101 and 102 as is typical in such centers. Configuration servers assumed present are also assumed to have communication capability between sites through proxy network 114, and to have internal configuration library connections to internal nodes within each site. One configuration object that is provided and needs to be configured on both sides are proxy queues for staging propagated proxy data in both proxy node 109 and proxy node 110.

In various embodiments of the invention, certain configuration objects must be present in both sites depending on the nature of routing intelligence used. Such common configurations may also include configured virtual agent groups (VAGs) and configured routing points (RPs) used in some consumer-to-provider event routing situations. Likewise, various adapters or server extensions may be provided to one or more of the stat servers (106) and (115) to ensure open mapping of object types in both consumer and provider sites and to enable support for an extended variety of contact center objects including queue objects and agent/place objects. Examples of such extensions and/or adapters will be described later in this specification. The exact requirement for duplicate configurations of contact center objects depends at least in part of the nature of event-handling services offered by the provider.

In this simple example, consumer site 101 is enabled to order statistics calculated by provider stat server 115 of queues 113 through queue monitoring by CTI server 116. In one example, consumer site 101 monitors estimated waiting time (EWT) of one or more queues 113 via proxy network 114 and stat server 115 through CTI server 116. In practice of the invention, stat server 106 may send an "Open Stat" (i.e., Open Statistic) request, or equivalent, via proxy network 114 to stat server 115, which is passed to proxy node 110. It is noted herein that an Open Stat request is typically initiated by a client of stat server 106 and then sent to the stat server.

Stat server 115 begins calculating queue stats from queue events provided through CTI monitoring performed by CTI server 116, which has a direct connection to queues 113. Although queues 113 may be monitored for a variety of statistics, in this example CTI server 116 monitors EWT and Stat server 115 responds to stat server 106 via proxy network 114 by periodically sending calculated EWT statistics for each of queues 113. In one embodiment, the statistics are propagated from site 102 to site 101 as CTI-user events or T-server events. In another embodiment, stat server 106 is enabled with a stat server Java extension SSJE and receives statistics based on that format via a data stream. It should be understood that various alternative event passing protocols can be used without departing from the instant invention.

Stat server 106 calculates EWT statistics from one or more local queues 104 through CTI server 108, which has access to those queues. Stat server 106 feeds URS 107 both the local and remote EWT statistics for use in route determination for each incoming event to switch 103. In this example, if the EWT in one or more provider queues 113 is less than the EWT in one or more local consumer queues, the incoming event for which the logic is executed will be routed to a provider queue for treatment by one of provider agents 112. Otherwise, the event is routed internally to a consumer queue 104 for local handling by one of agents 105. If one provider queue EWT is compared with one consumer queue EWT then whichever queue has less wait time becomes the routing target for the event. In the case of several queues in both sites, an averaged EWT or ASA for all of the queues may be used.

In practice stat server 106 is alerted by a stat server client to forward a stat request to open stats during event processing at the consumer site. The request is propagated as an open stat request through proxy network 114 to stat server 115. Stat server 115 begins calculating statistics based on CTI events compiled in CTI server 116. Calculated statistics or "proxy statistics" are sent back to stat server 106 via proxy network 114. Stat server 106 feeds those statistics to URS 107 along with "local statistics" for use in routing determination on a event-by-call event. Any events routed from switch 103 to switch 111 are predicated by a CTI-route event notification propagated from CTI server 108 to CTI server 116 at the time of switch execution. In this way, notification of an incoming event may be received by an agent ahead of the actual event.

Queue statistics other than EWT can be used for determining whether an incoming event into the consumer site (101) will be routed to the provider site (102) or handled locally. For example ASA may be the monitored statistic as described above. Depending on routing strategy, combinations of statistics monitored and propagated from the provider site to the consumer site might be used in routing strategy at the consumer site. The purpose of enabling the consumer to access provider site statistics is to provide the consumer with automated intelligence at the time of event processing relative to the flow that can be successfully diverted to the provider site at any given period without overloading the provider site or under utilizing the consumer site.

Usage of Multiple Statistics Definitions in Routing Strategy

In typical routing strategy only a single common statistics definition is applied in a target selection statement for routing. A typical routing target selection statement for a common routing server can be expressed in the following pseudo code . . . .

```
// define target list
    List = "Queue1, Queue2"
// define target variable
    Target= SelectDN(EWT, List)
// route event to the target
    RouteCall(Target)
```

The target selection strategy for a routing server is modified for accommodating multiple statistics definitions. A modified target selection statement incorporating both provider and consumer targets might be expressed using the following pseudo code (there are two target lists in this code example, where list 1 indicates consumer queues and list 2 indicates provider queues):

```
// define two target lists
    List1 = "Queue1"
    List 2= "Queue2"
// define two target variables
    Target1= SelectDN(EWT, List1)
    Target2= SelectDN(FP_EWT, List2)
```

The routing strategy has a condition in this case in which EWT for both consumer and provider queues are compared to determine routing:

```
//conditionally select target with min statistical value
    If (GetStatValue(Target1) > GetStatValue(Target2)) then
        Target=Target2 else
    Target=Target1
// route call to the target
    RouteCall(Target)
```

The entire process of opening statistics monitoring at the provider site and propagating statistics from the provider site to the consumer site via the proxy network is automated and is performed transparently to agents or contact center administrators. Only the objects that the provider agrees to expose to the consumer are visible on the consumer end with regard to clients of the consumer stat server including routing servers, and certain other contact center applications. The provider can provide the required information to the consumer in a way that does not open the provider's infrastructure for consumer access.

Figure 2:
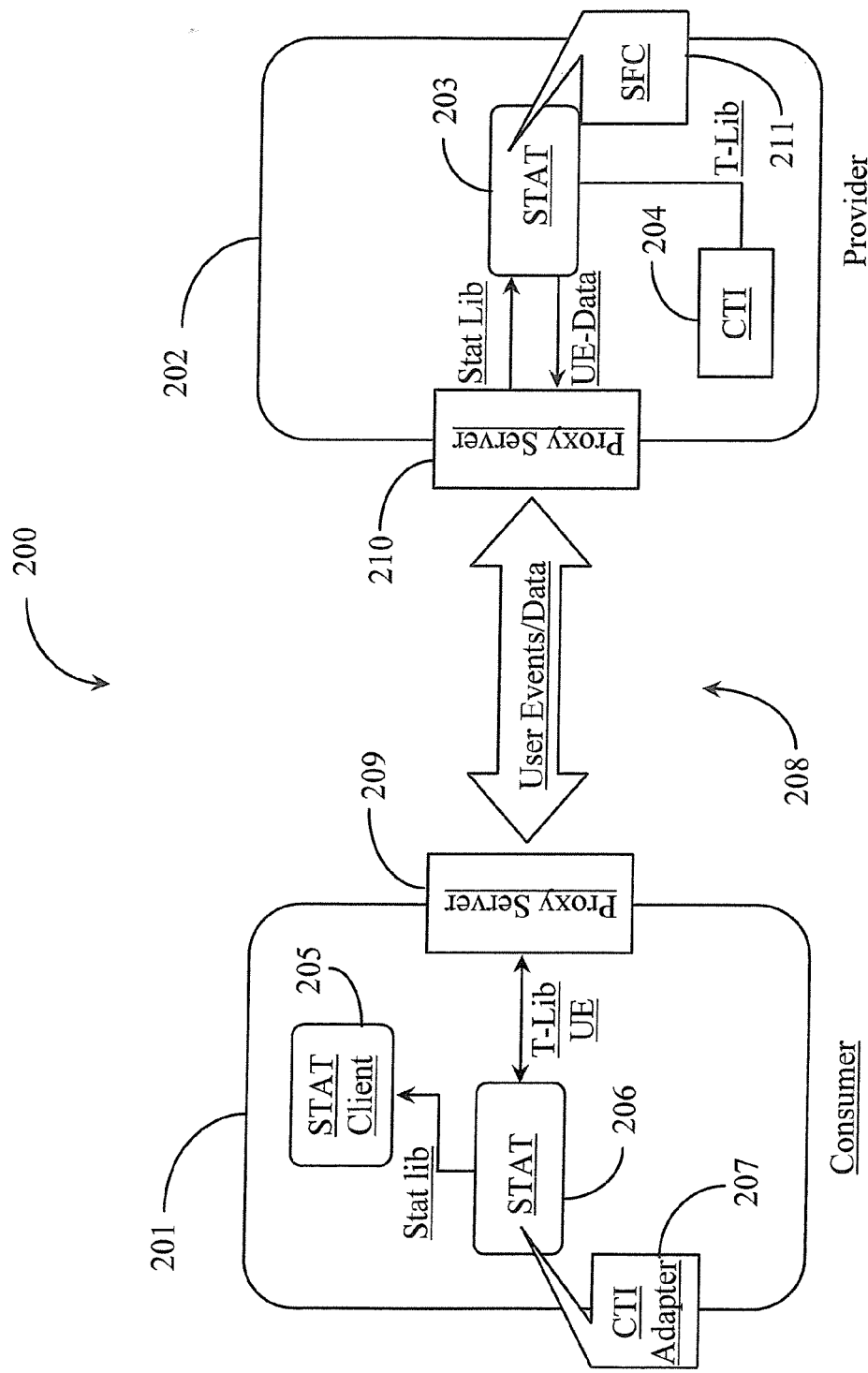
FIG. 2 is a block diagram illustrating the statistics propagation system of FIG. 1 according to an embodiment of the invention.

FIG. 2 is a block diagram illustrating a federated contact center 200 adapted with a proxy statistics propagation network 208 according to an embodiment of the invention. Federated contact center 200 includes a consumer contact center 201 and a provider contact center 202. In this example event queues and contact center agents are not illustrated but may be assumed present as in FIG. 1. Likewise, URS server capability is not illustrated in consumer site 201 but may be assumed present as well.

In this example, remote statistics calculated at provider site 202 are received at consumer site 201 in the form of CTI-user events or more particularly T-server lib user events known to the inventor. Consumer site 201 includes a stat server 206 enhanced with a CTI-adapter 207 enabling it to receive CTI-based user event data (T-lib UE) from a consumer proxy server node 209 connected by network to a provider proxy server node 210 forming a proxy network 208 analogous to proxy network 114 of FIG. 1.

Provider site 202 includes a CTI server 204, which may be a T-server known to the inventor, and a stat server 203. CTI server 204 compiles and reports queue-based and agent-based events through a t-lib interface to stat server 203. This occurs after stat server 203 has received a request to "Open Stats" from stat server 206 over federated proxy network 208. The stat request may arrive over a stat lib interface in the native format common to stat server 203. User events are processed by stat server 203 to calculate statistics for the provider queue or queues. Optionally, stat server 203 may include a stat format converter (SFC) 211 for converting the native data format of statistics to CTI-based user event data format for propagation.

In this embodiment, stat server 203 sends user event data containing the statistical values related to the provider queue or queues to provider proxy server 210 for propagation to consumer site 201. Provider proxy server 210 forwards the UE data to consumer proxy server 209 over the network. Server 209 forwards the statistics in the same CTI-based user event format to stat server 206, which is aided by CTI adapter 207. A local CTI server is not illustrated in consumer site 201 but may be assumed present for local queue monitoring and switch control.

Stat server 206 makes the current statistics available to any stat client such as stat client 205, which may be an intelligent routing server like URS 107 of FIG. 1 for example. The current statistics include those from the provider site and those from the local queue or queues. These stats are published through a stat lib interface to stat client 205. If stat client 205 is a routing server, it may incorporate those statistics in determining routing of events registered at the consumer site for processing. In this case the open stat request from stat server 206 is in native format useable at stat server 203 but the response data served back to stat server 206 is a more general T-server-based format. Stat server 206 may publish statistics in either format provided clients are adapted to receive CTI-based user event data values representing the stat values. In order to receive statistics based on user data values from CTI-based (T-server) based user events, statistics needs to be opened with following parameters:

(1) TotalCustom Value stat type category;
(2) time profile type selection; and
(3) change-based notification mode.

The following stat type can be used to propagate user data values submitted in user events, in this case using a pre-defined key of [FP_EWT], FP indicating the event was propagated via federated proxy.

```
[FP_EWT]
Category = TotalCustomValue
Objects = GroupQueues, Queue, RoutePoint
MainMask = UserEvent
Subject = DNAction
Formula = GetNumber("EWT", 0)
```

The time profile type stat enables replication of statistical values provided in the user events propagated via F-Proxy. An example is shown below:

```
[TimeProfiles]
SelectOne,Selection = 1
```

Wherein "SelectOne" is the name of the time profile and "Selection" is the stat type. In this case the number of actions selected for aggregation is set to 1 meaning no aggregation.

Referring back to the routing strategy, statistical values having two different statistical definitions are combined in the target selection. For example, one stat type is the provider stat type and the other is the consumer. If there is more than one possible provider, there may be more than two different stat types that have to be mitigated in the target selection statement. One of the two stat types in this example, the provider queue EWT is requested using a stat API open stats request as described further above.

A string variable "FP_Stat" defines statistics based on FP_EWT stat type using SelectOne time profile described further above. The logical expression specified in an IF-block in the code is used by URS strategy to compare the value of FP_Stat statistics requested for the provider queue with the value of StatExpectedWaitingTime statistics requested for the consumer queue. Both statistics are requested using an SData function. If EWT in the provider queue is less then EWT in the consumer queue, then the URS will place call to Provider Queue. Otherwise it will place call to Consumer Queue. In this respect the actual Target assignment has to be consistent with the logical expression specified in the IF-block, for example, the true branch should to be linked to the provider queue because it is the queue specified at the left side of less-operator of the logical expression.

It is noted herein that the code presented herein for routing strategy is exemplary only; other formats and language might be used to express routing strategy without departing from the spirit and scope of the invention. Moreover, other statistics or statistical combination may be used requiring different expressions or formulas for computation.

Figure 3:
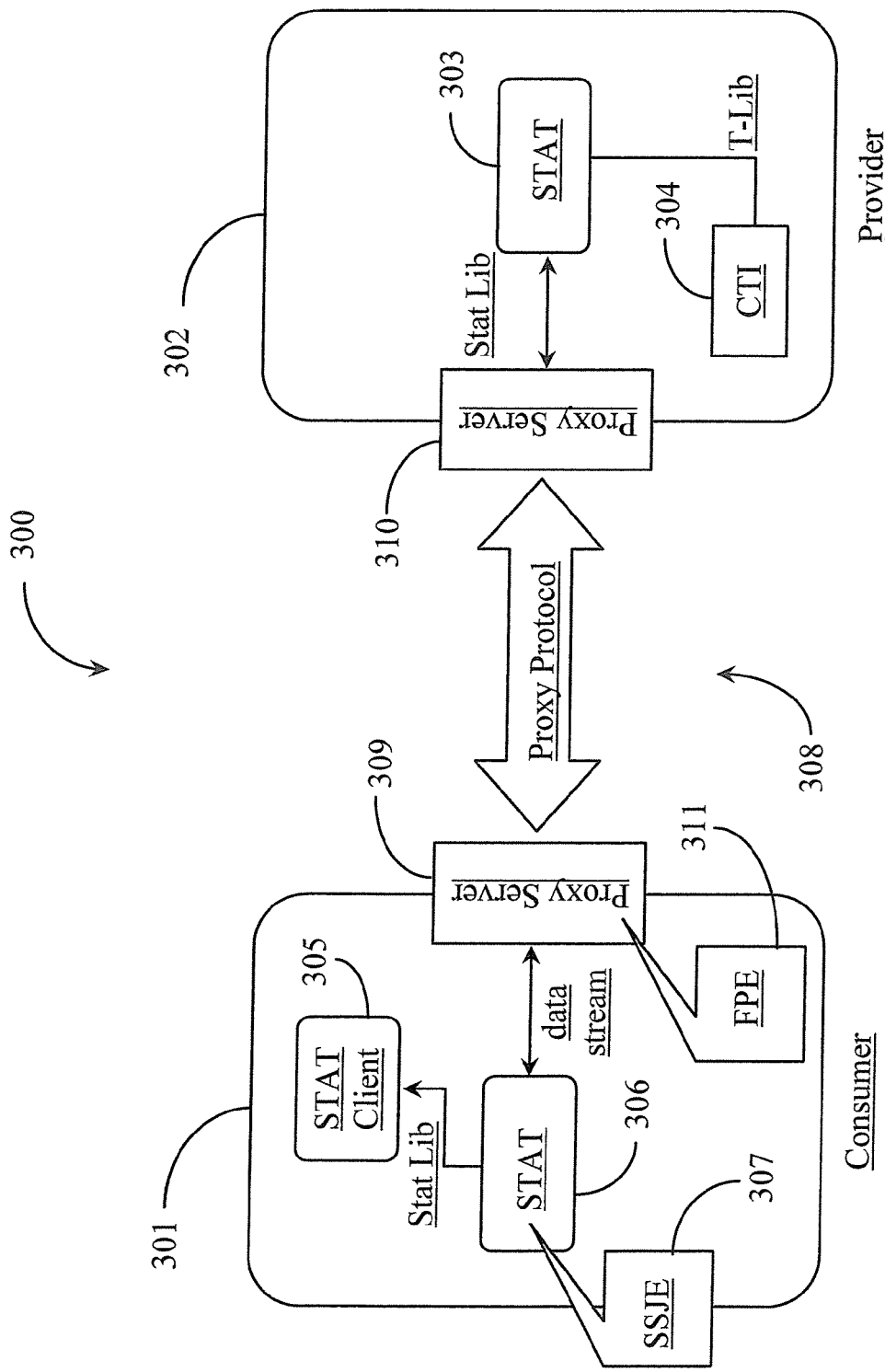
FIG. 3 is a block diagram of the statistics propagation system of FIG. 2 adapted for a data stream data protocol according to an embodiment of the invention.

FIG. 3 is a block diagram illustrating a federated contact center 300 adapted with a proxy statistics propagation network 308 according to an embodiment of the present invention. Federated contact center 300 includes a consumer contact center 301 and a provider contact center 302. F-Proxy network 308 includes a consumer-side proxy server 309 and a provider-side proxy server 310 connected by a data network as described further above.

Consumer site 301 includes a stat server 306 and a stat client 305, which may be a routing server like URS 107 described above. In this example, stat server 306 is enhanced with a stat server Java extension (SSJE) package 307, which in turn is integrated to proxy network 308 via a federated proxy extension (FPE) package 311 running on stat serve 306. A proprietary proxy protocol is used to propagate the statistics data.

Provider site 302 includes a stat server 303 and a CTI-server 304 for compiling statistics. Queues, agents, route points, and switches are not illustrated in either consumer or provider sites, but may be assumed present in both sites. Likewise, a CTI server for monitoring consumer queue, rout points, and agent events is not illustrated but may be assumed present.

In this example, two stat type definitions are used. These are total number of abandoned calls, and the total number of answered calls. The statistics are expressed differently in each of the contact center sites. For example, the consumer site stat server is enabled with SSJE and redirects an OpenStatRequest using FPE 311 to provider stat server 303 via the proxy network. FPE 311 maps the stat type parameter to the known provider-side value that enables provider statistics monitoring and calculation on the provider site.

The following stat types need to be configured for both the provider and the consumer. The provider expression might look as follows:

```
[Total_Abandoned]
Category=TotalNumber
MainMask=CallAbandinedFromRinging
```

```
CallAbandoned
Objects=GroupQueues,Queue,RoutePoint
Subject=DNAction
[Total_Answered]
Category=TotalNumber
MainMask=CallAnswered
Objects=GroupQueues,Queue,RoutePoint
Subject=DNAction
```

The consumer expression according to SSJE might look as follows . . . .

```
[FP_Total_Abandoned]
Category=JavaCategory
Objects=GroupQueues,Queue,RoutePoint
JavaSubCategory=<Package>:<Class>
[FP_Total_Answered]
Category=JavaCategory
Objects=GroupQueues,Queue,RoutePoint
JavaSubCategory=<Package>:<Class>
```

Referring now back to FIG. 3, stat server client 305, which may be a URS in this case, opens statistics based on "FP_Total_Abandoned" stat type by sending a request to stat server 306. FPE 311 re-maps the value of Stat Type parameter to "Total_Abandoned" and passes the Open Stat request to the stat server 306 as a request to open stats. Consumer stat server 306 forwards the re-mapped request to consumer proxy server 309 using data stream protocol, which is part of the functionality of SSJE. The open stat request is then forwarded from consumer proxy 309 to provider proxy 310. At the provider end, the provider proxy server sends the request to provider stat server 303 over a stat lib interface (Stat lib) using a stat server client application program interface (API).

Once statistics are registered in provider stat server 303, results are periodically sent back to provider proxy node 310 through a stat lib interface. In turn, provider proxy node 309 propagates results back to consumer proxy node 309 and node 309 sends the data to FPE 311 via data stream interface to the requesting stat client, in this case a URS. Consumer stat server 306 periodically pulls the data from FPE 311 and publishes the data values to the stat client. In one embodiment, historical statistics relative to ASA or EWT provider stats might be used predict resulting values to help mitigate to some extent any delays in receiving data across the federated proxy network 308.

Figure 4:
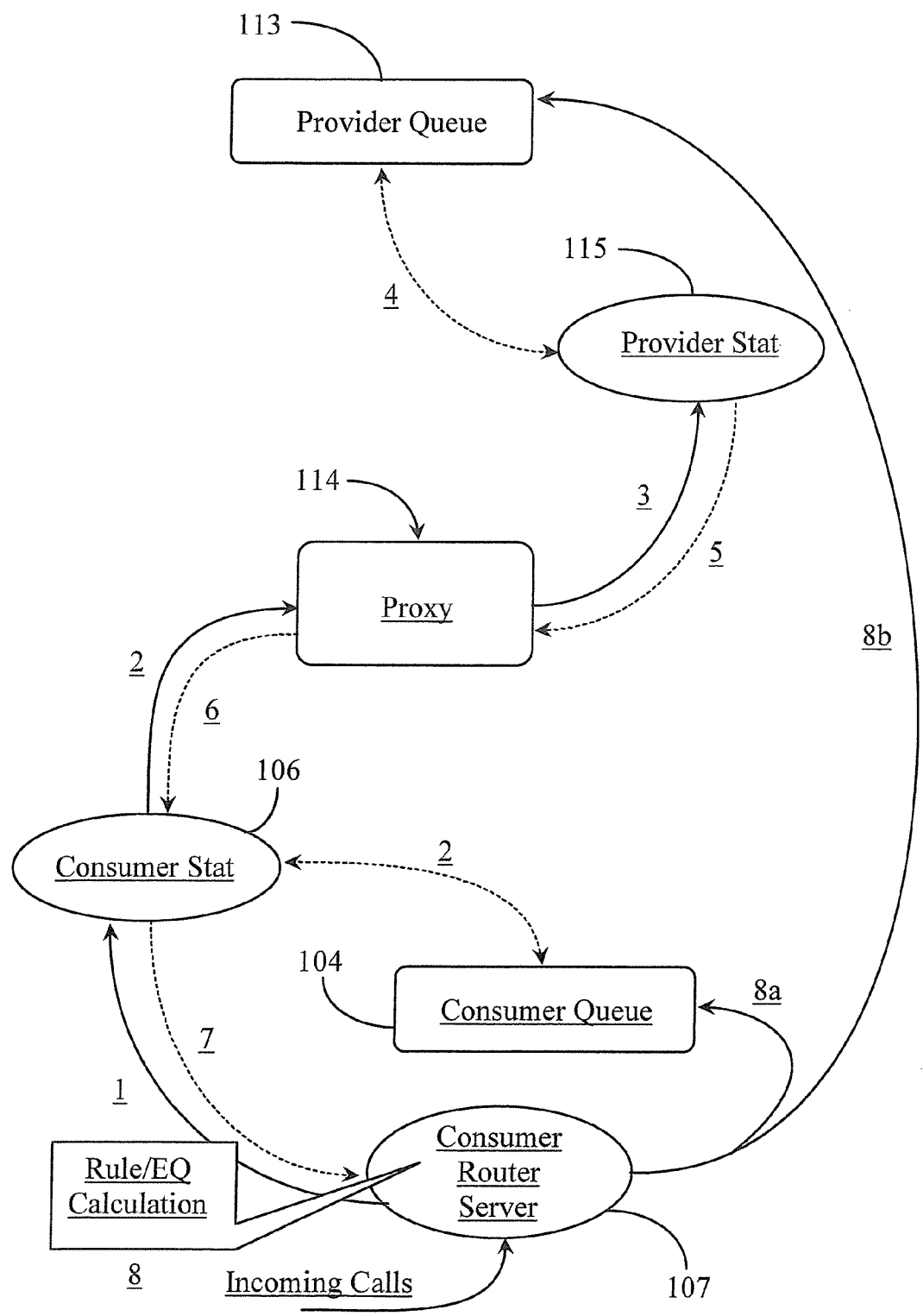
FIG. 4 is a block diagram illustrating steps for executing remote statistics mining and application of those statistics in call routing.

FIG. 4 is a block diagram illustrating steps for propagating statistics across a federated proxy network according to an embodiment of the present invention. Physical elements of FIG. 4 involved in statistics propagation and queue monitoring are taken from the example of FIG. 1. They retain the same element numbers and are not re-introduced in this example. Consumer router server 107 opens statistics by sending an open stat request to consumer stat server 106 in step 1. The request may include intent of opening both local stats and remote (provider) stats. It is assumed herein that an open stat request is a request to "begin" monitoring and statistics compilation. In this embodiment, the most current statistics are used in determining a route for each incoming event that router 107 must process.

At step 2, consumer stat 106 begins calculating statistics locally from consumer queue 104 and also forwards the open stat request over proxy network 114 (both proxy server nodes and connecting network) to provider stat server 115. In one embodiment, two separate stat requests are initiated by a stat client, one for local (consumer) stats and one for remote (provider) stats. At step 3, provider stat server 115 receives the request from the consumer stat server over the proxy network. At step 4 the provider stat server begins calculating statistics relative to provided queue 113.

In step 5, provider stat server 115 sends statistical values back over proxy network 114 to consumer stat server 106, which receives those statistical values in step 6. Consumer stat server 106 then makes the statistics values for both consumer queue 104 and for provider queue 113 available to consumer router 107. Consumer router server 107 executes a strategy for routing determination of a next incoming event in queue at step 8 using the statistical values received from consumer stat server in step 7 in an equation or a comparison according to rule. Consumer router server 107 selects one of two targets for the event, consumer queue 104 or provider queue 113. If the results of step 8 specify consumer queue 104 as the target, router server 107 routes the event at step 8a to the consumer queue. If the results of step 8 specify provider queue 113 as the target, then at step 8b the event is routed to provider queue 113. In one embodiment, the incoming events are already in the consumer queue by default and the only additional routing is re-directing events in queue to the provider queue based on route determination results.

One with skill in the art of telephony will appreciate that there may be more than one or two consumer and provider queues to consider as routing targets. Likewise routing may be to a routing point that targets a group of agents and further routing among the agent group may be performed at either site, such routing not specifically related to the target determined by evaluating the statistics. One such embodiment is presented below.

Figure 5:
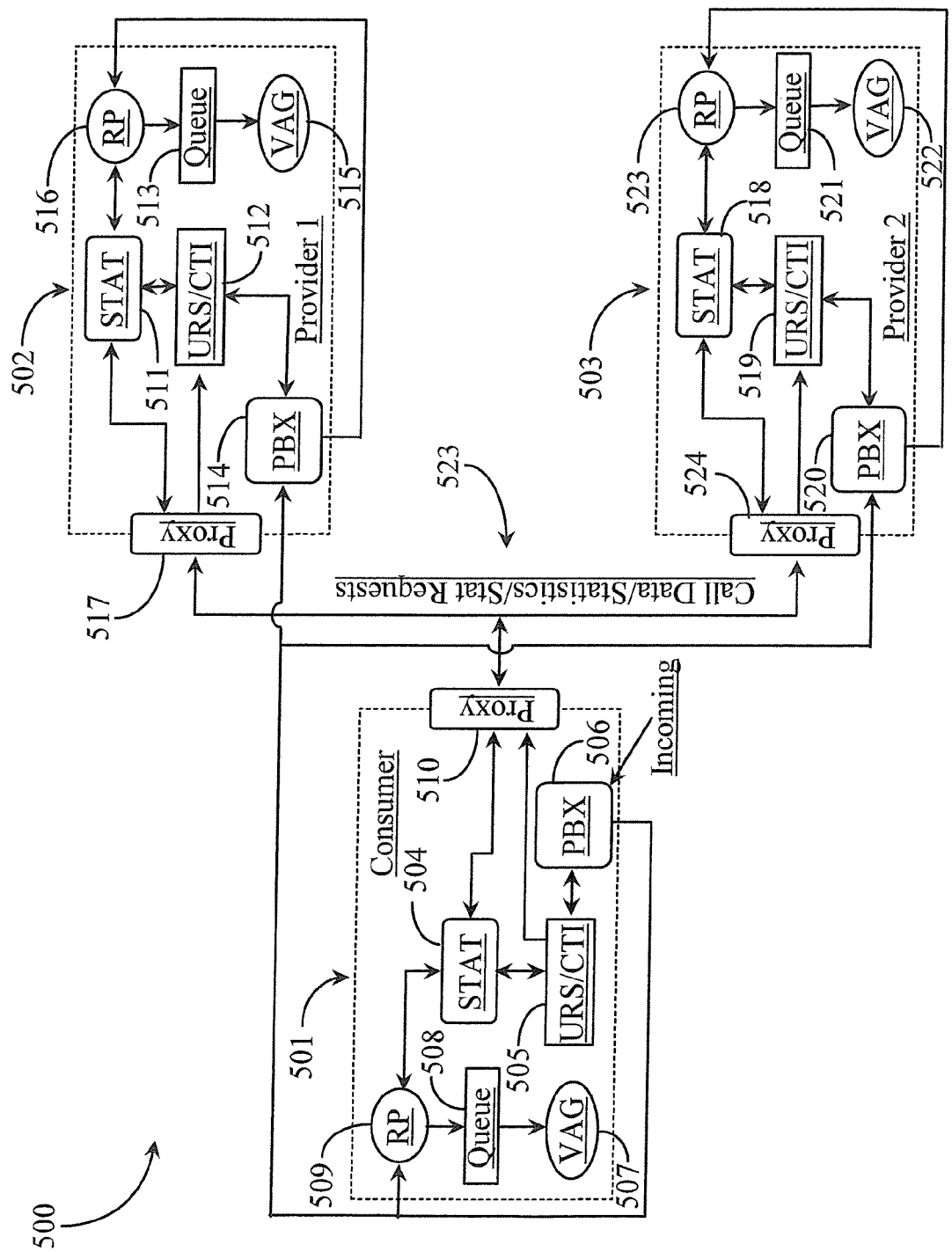
FIG. 5 is a block diagram illustrating a federated contact center engaged in a skills based routing process.

FIG. 5 is a block diagram illustrating a federated contact center 500 using proxy statistics in a skill-based routing situation. Federated contact center 500 includes a consumer contact center 501 and two provider contact centers, center 502 and center 503. In this example a queue-based statistical analysis approach for EWT is extended to determine whether incoming events requiring handling according to skills will be handled internally of distributed to one of the two providers, in this case, that also have agents with the required skill sets to handle the event. If the consumer decides a provider will handle an event, then the consumer will make a decision internally relative to each incoming event at a PBX switch 506 illustrated within consumer domain 501 which provider 502 or 503 will be selected to handle the incoming event based on statistics related to availability of agents having the correct skill sets for handling the event.

Consumer site 501 includes a stat server 504 for calculating local queue statistics and for receiving remotely calculated statistics from both provider sites 502 and 503 over a federated proxy network 523. In this example, contact center sites 501, 502, and 503 have routing strategy (URS) and CTI capability (CTI) combined on one server, server 505 in site 501, server 512 in site 502, and server 519 in site 503.

Consumer site 501 includes a PBX switch for taking incoming events from the telephone network illustrated herein as a directional arrow labeled Incoming. The basic architecture is similar to previous examples described above. A proxy server 510 is provided in consumer site 501 that communicates with two other proxy servers, proxy server 517 in provider site 502, and proxy server 524 in provider site 503 comprising a federated proxy network 523 for propagating statistics from both provider sites to the consumer site and event data associated with routed events from the consumer site to both provider sites.

In each site, respective stat servers are connected to the onsite federated proxy servers as described above in other embodiments. URS/CTI 505 is connected to PBX 506 to enable statistics monitoring of a routing point (RP) 509, at least one queue 508, and a virtual group of agents (VAG) 507 that are assigned according to skill set to work queue 508 in an agent skill-based routing environment. Incoming events at switch 506 that are to be handled by skill-based routine internally by consumer site 501 are routed to RP 509 and queued for agents in queue 508 shared by available agents in VAG 507 that process those events according to a skills match of the agent to a skill level requirement for handling a particular event.

In order to have providers that may similarly handle routed events based on the same intelligence used in consumer site 501, they must be similarly equipped (routing intelligence, and capabilities) according to a common service objective (SO). Therefore, provider sites 502 and 503 include the same or at least compatible routing strategies and CTI capabilities in (URS/CTI) 512 and 519. Moreover, routing points (RPs) 516 and 523 and virtual agent groups (VAGs) 515 and 522 comprising agents having the required skill sets for handling events based on the common routing intelligence routines (URS) are required to service the consumer appropriately. The RPs are assigned a unique destination number (DN) for routing purposes that is available in the consumer site for application in route point designation during determination of where to route each event.

At least one queue 513 is provided for VAG 515 in site 502 and at least one queue 521 shared by VAG 522 is provided in site 503. PBX switch 506 has telephony network connectivity to PBX 514 at site 502 and PBX 520 at site 503 for event re-direction. Although not illustrated in this example, configuration servers may be present in all of the federated sites for the purpose of consistent site-to-site propagation of configuration objects like queues routing points virtual agent groups and so on. Although configuration network connectivity is not specifically illustrated between center sites in federated contact center 500, one may be assumed present for establishing same and/or compatible contact center objects in all of the sites that are consistent with the consumer service level objective (SLO).

In this example at the beginning of any period of agent skill-based routing campaign of incoming events, URS in server 505 sends an OpenStat request to consumer stat server 504, which propagates the request to stat servers 511 in provider site 502 and to stat server 518 in provider site 503 over federated proxy network 523. Stat servers 511 and 512 begin calculating statistics through CTI monitoring of at least RPs 516 and 523, queues 513, and 521. Statistics are propagated back to stat server 504 over proxy network 523 and become available for use in routing to URS 505 along with local statistics about RP 509, queue 508, and VAG 507. It is not critical that all monitored statistics are actually used in routing determination for incoming events. In one case only EWT at RPs 509, 516, and 523 might be used to determine whether the consumer or one of the providers will handle an event. However, for more complex routing intelligence, statistics could be compiled and propagated for queue events, route point events, and VAG states. In one case, EWT is determined as the time between the point that an event arrives at a routing point to the time that an agent from a VAG answers the event.

For each incoming event at switch 506, consumer CTI server 505 may make a first determination whether the event needs to be handled by a skill-based routine. If it does, then URS 505 calls current EWT statistics for provider RP 1 (516), provider RP 2 (523), and consumer RP 0 (509). URS then compares the values to determine basically where the event will be routed according to which RP has the least amount of time to wait. In this example, the selection of the agent once an event is registered at one of the provider routing points is handled locally at each site. For each event routed from PBX 506 to PBX 514 or to PBX 520, any event data is propagated over federated proxy network 523 to the appropriate URS/CTI server for routing the data to the responding agent at the time of or ahead of the event that the agent will handle. In the event that agent selection is not made and agents pull from a subscribed queue, the queue event can be used to direct the event data to the appropriate agent station just after the agent has answered the event.

Figure 6:
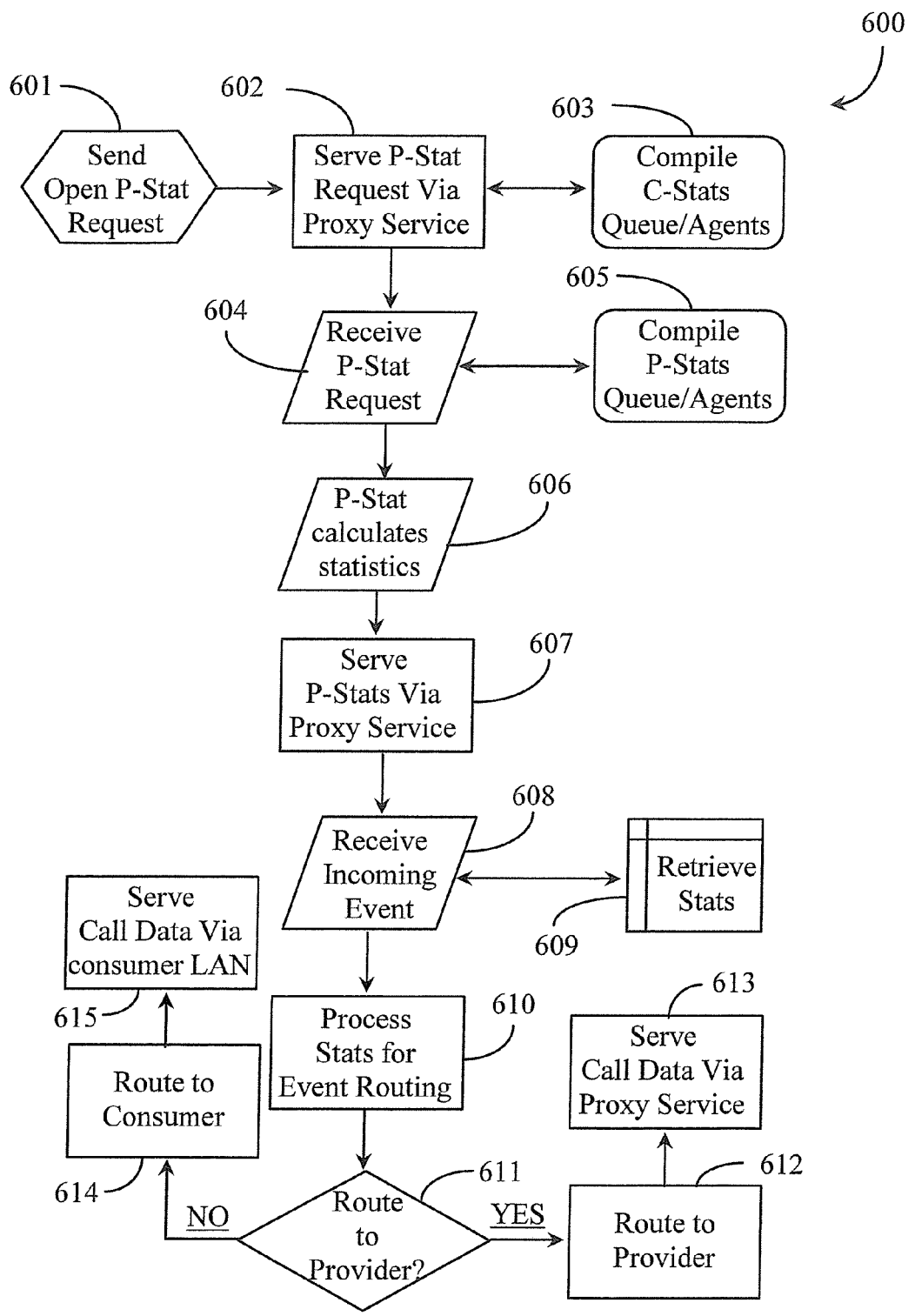
FIG. 6 is a process flow chart illustrating steps for practicing remote statistics mining and using mined statistics in routing intelligence according to an embodiment of the invention.

FIG. 6 is a process flow chart illustrating basic steps 600 for practicing federated event distribution according to an embodiment of the present invention. At step 601, a stat client, typically an intelligent router such as a URS in the consumer site sends an OpenProviderStat request to a stat server in the consumer site. At step 602, the local stat server at the consumer site sends the OpenProviderStat request to a provider site stat server via a federated proxy network such as network 523 of FIG. 5 above. At step 603, the consumer stat server also begins compiling consumer queue stats and consumer agent stats if not already being compiled through CTI monitoring.

At step 604, the provider stat server receives the OpenProviderStats request, and at step 605 begins compiling provider queue stats and provider agent stats if not already being compiled through CTI monitoring. At step 606, the provider stat server calculates statistics. At step 607, the provider stat server serves calculated statistical values (P-Stats) to the consumer stat server over the federated proxy network. Provider stats are now available in the consumer site and accessible to stat server clients. In one embodiment, the federated proxy network of the present invention can be packaged and provided to federated contact center sites as a proxy service provided and configured by a third-party service provider.

At step 608 in conjunction with proxy statistics propagation and receipt at the consumer site, which may loop periodically, the consumer site receives an incoming event for routing. At step 609, routing strategy (URS), retrieves or is pushed the most current consumer and provider stats from the consumer stat server. At step 610, the URS processes the consumer and provider stats according to routing rule or equation for event routing determination for the incoming event. The URS makes a determination at step 611 if the event will be routed to the provider site for handling. Such a determination may be made for example, according to EWT comparison between the provider and consumer queues as described further above. It should be noted here that other types of statistics or combinations of statistical values obtained based on other routing criteria or strategies may be substituted for EWT values and routing strategy.

If at step 611, the URS strategy is to route the event to the provider (EWT P-Queue<EWT C-Queue), then at step 612 the event is routed to the provider site and at step 613 the consumer CTI server sends data about the event to a provider CTI server at the provider site. The CTI server then makes the data available to the agent that will handle the event.

If at step 611, the consumer URS determines that the event will not be routed to the provider (EWT P-Queue<EWT C-Queue, else: route to C-Queue), then the event is routed to the consumer queue at step 614. At step 615, the consumer CTI server can serve any data via consumer LAN to the agent that will handle the event. Data when served over the proxy or via LAN to an agent may include notification of the pending event both for subscription events or for ringing events.

It is noted herein that provider stats and consumer stats may be consulted on a n event-by-event basis or on a basis of a number of events waiting. For example, a decision based on current EWT may be made to route the next 10 events to the provider or to the consumer. There are many possible variations. In another embodiment, statistics may be compiled and calculated by the consumer against the historical values of Proxy Stats served from a provider site to a consumer site. In such a scenario, a prediction may be made as to what the EWT, for example, will be at the provider site queue and the event may be routed ahead of consultation of the actual provider queue statistics relative to the real consumer statistics. In this case, any time delay where the event is waiting on proxy statistics service can be somewhat mitigated. There are other approaches that may also be used to determine real time conditions in the provider queue.

Setting and Monitoring of Service Level Objectives

In one aspect of the present invention, the federated proxy network of the invention can be used to propagate provider statistics about key performance indicators (KPIs) that help to establish service level objectives (SLOs). For optimized performance, the consumer site sets its own SLO and provider sites must have their SLOs established that are largely consistent with the overall consumer figure taking into account the possibility of multiple provider sites interacting with the consumer site in the federation.

Therefore, use of proxy statistics propagation from provider sites to a consumer site is applicable to other processes that may aid service maximization such as monitoring certain KPIs both locally and by proxy. In this case, the consumer initiates the statistical gather process in the same way as with routing albeit different stat clients use the information to monitor and adjust SLO attributes.

In one embodiment a SLO can be defined as a threshold relative to Time to Answer measured from a point in time when an event is registered at a routing point to the point in time when an agent begins processing the event. A typical KPI related to the SLO can be defined as a ratio of calls answered within the SO threshold time over all answered calls. Therefore a service factor (SF)=(Answered within SO/Answered*100%)

Referring now back to FIG. 5, statistics may be propagated from one or more provider sites (502, 503) to consumer site 501 over federated proxy network 523 to monitor and possibly adjust the consumer service factor to optimize distribution performance for the consumer. Arguably, the most challenging part of this is determining the number of calls answered within the consumer SO threshold given that time to answer is measured in this case from the moment an event hits a consumer routing point to the moment of time when the event is picked up by a provider agent.

The calculation has to be done on the provider site because that is where the event is handled. Since the provider site does not know anything about the event before it hits the provider site routing point, the consumer site has to report to the provider site how long it took for the event to be routed to the provider routing point from the consumer routing point. The following method can be used to mitigate the otherwise unknown time delay of "time to distribute". Once an event is registered in a consumer routing point such as RP 509, CTI server or some other mechanism tags the event using a time stamp. A routing number or any other consumer identification number can be used to associate the time stamp to the event.

When the re-directed event is handled by an agent of the provider site the time of the initial route request that happened at the consumer site can be stripped and used by the provider stat server to calculate (Time to Answer) statistics. In this way, the number of calls answered within the consumer SO threshold can be measured by a formula that for evaluating the Time to Answer measurement against the SO threshold expected for each answered call. In a further step, the statistics propagation to the consumer (501) over the proxy network (523) calculated by the provider (502,503) to help set provider SLO expectation of each provider based on the appropriate consumer SLO values. The values C-SLO and P-SLO will not be exactly the same as some time may pass while events are waiting at the consumer to be routed to the provider. Time to distribute criteria can be used to adjust for delays. For example, SO (provider)=SO (Consumer)−Time to Distribute (Consumer->Provider). Time to Distribute statistics can, in one embodiment, be measured at both consumer and provider sites independently. In this example, the value Time to Distribute is a threshold that acts as a referee preventing the consumer site from overloading the provider site with events or ensuring that the provider site has enough resources to maintain an adjusted SLO based on consumer expectations without undue dropping.

In one embodiment, a combination of the user event (UE) approach, which is basically limited to contact center objects of a DN type and the SSJE approach, which supports virtually any object type but is limited to propagation of atomic statistics only, is used wherein the UE approach forms a basis for the SSJE implementation as both Stat lib and F-Proxy integrated statistics can be reused. In turn, SSJE, may be used as a basis for Stat server core as the SSJE data stream protocol support can be reused for current state and current target state statistics propagation.

It will be apparent to one with skill in the art that the federated proxy statistics propagation system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A routing system comprising:
   a processor; and
   a memory storing instructions that, when executed by the processor, causes the processor to:
      collect first statistics regarding a first call queue from a first statistics server for a first contact center comprising a call router, the first contact center being a consumer contact center, the first statistics adhering to a first protocol compatible with the call router;
      receive second statistics regarding a second call queue from a second statistics server for a second contact center, the second contact center being a third party provider contact center, the second statistics adhering to a second protocol different from the first protocol, wherein the second statistics are converted to adhere to the first protocol; and
      supply the first statistics and the converted second statistics to the call router, for selecting a call queue from a plurality of call queues to route the call to in accordance with the first statistics and the converted second statistics, the plurality of call queues comprising the first call queue and the second call queue.

2. The routing system of claim 1, wherein the second statistics comprise at least one of:
   an estimated wait time;
   an average speed to answer;
   a total number of answered calls;
   a total number of abandoned calls; or
   a ratio of abandoned calls to answered calls.

3. The routing system of claim 1, wherein the call router is configured to select the call queue by comparing the first statistics against the second statistics.

4. The routing system of claim 1, further comprising a proxy server comprising a processor, the proxy server being configured to:
   receive the second statistics; and
   convert the second statistics to the first protocol.

5. The routing system of claim 1, wherein the statistics server is configured to convert the second statistics to the first protocol.

6. The routing system of claim 1, wherein the statistics server is further configured to submit a request for statistics to a second statistics server of the second contact center.

7. The routing system of claim 6, wherein the second statistics server is configured to begin calculating statistics when it receives the request.

8. A method for routing calls, the method comprising:
   calculating, by a processor of a first statistics server, first statistics corresponding to a first call queue for a first contact center, the first statistics adhering to a first format, the first contact center being a consumer contact center;
   receiving, on the processor, second statistics from a second contact center, the second statistics corresponding to a second call queue for the second contact center, the second statistics adhering to a second format different from the first format, wherein the second statistics are converted to adhere to the first format, and wherein the second contact center is a third party provider contact center; and
   supplying, from the processor, the first statistics and the converted second statistics to a call router of the first contact center for selecting a call queue from a plurality of call queues to route the call to in accordance with the first statistics and the converted second statistics, the plurality of call queues comprising the first call queue and the second call queue.

9. The method of claim 8, wherein the second statistics comprise at least one of:
   an estimated wait time;
   an average speed to answer;
   a total number of events answered;
   a total number of events abandoned; or
   a ratio of abandoned calls to answered calls.

10. The method of claim 8, wherein the selecting the call queue comprises comparing the first statistics against the second statistics.

11. The method of claim 8, further comprising:
    receiving, on a proxy server comprising a processor, the second statistics; and
    supplying the converted second statistics to the statistics server,
    wherein the proxy server is configured to perform the converting the second statistics to the format compatible with the call router.

12. The method of claim 8, wherein the processor is configured to perform the converting the second statistics to the format compatible with the call router.

13. The method of claim 8, further comprising submitting a request for statistics to a statistics server for the second contact center.

14. The method of claim 13, further comprising beginning to calculate statistics on the statistics server for the second contact center when the statistics server for the second contact center receives the request for statistics.

* * * * *